United States Patent
Pottorf et al.

(10) Patent No.: US 10,445,160 B2
(45) Date of Patent: Oct. 15, 2019

(54) REMOTE MONITORING OF CRITICAL REACTOR PARAMETERS

(71) Applicant: NuScale Power, LLC, Corvallis, OR (US)

(72) Inventors: Jason Pottorf, Corvallis, OR (US); Ted Hough, Corvallis, OR (US)

(73) Assignee: NUSCALE POWER, LLC, Corvallis, OR (US)

( * ) Notice: Subject to any disclaimer, the term of this patent is extended or adjusted under 35 U.S.C. 154(b) by 779 days.

(21) Appl. No.: 14/973,299

(22) Filed: Dec. 17, 2015

(65) Prior Publication Data

US 2016/0189811 A1 Jun. 30, 2016

Related U.S. Application Data

(60) Provisional application No. 62/098,514, filed on Dec. 31, 2014.

(51) Int. Cl.
*G21C 17/00* (2006.01)
*G06F 11/00* (2006.01)
(Continued)

(52) U.S. Cl.
CPC .............. *G06F 11/00* (2013.01); *G21C 17/00* (2013.01); *G21D 1/00* (2013.01); *G21D 3/04* (2013.01); *G21D 3/06* (2013.01); *Y02E 30/40* (2013.01)

(58) Field of Classification Search
CPC . G06F 11/00; G21D 3/06; G21D 3/04; G21D 1/00; G21C 17/00
(Continued)

(56) References Cited

U.S. PATENT DOCUMENTS

2008/0069290 A1 3/2008 Park et al.
2011/0160922 A1 6/2011 Santos
(Continued)

FOREIGN PATENT DOCUMENTS

JP 2011095095 5/2011
JP 2011-196801 A 10/2011
(Continued)

OTHER PUBLICATIONS

International Search Report and Written Opinion issued in corresponding International Application No. PCT/US2015/066471, dated Mar. 28, 2016, 10 pages.
(Continued)

*Primary Examiner* — Jack W Keith
*Assistant Examiner* — Daniel Wasil
(74) *Attorney, Agent, or Firm* — Schwabe Williamson & Wyatt

(57) ABSTRACT

A nuclear reactor instrumentation system monitors a nuclear power system that includes a reactor core within a reactor vessel and one or more sensors for monitoring parameters of the nuclear power system. The nuclear reactor instrumentation system includes a computer having a processor and configured to be powered by a normal power source and a backup power source; a wireless transmitter operable under the control of the processor; and a memory coupled to the processor and containing stored programming instructions. The stored programming instructions are executable by the processor to cause the processor to receive data from the sensors; identify a loss of normal power from the normal power source; and in response to identifying the loss of normal power, cause the wireless transmitter to transmit the received data.

20 Claims, 3 Drawing Sheets

(51) Int. Cl.
*G21D 3/06* (2006.01)
*G21D 1/00* (2006.01)
*G21D 3/04* (2006.01)

(58) Field of Classification Search
USPC .................................... 376/245, 247, 259
See application file for complete search history.

(56) References Cited

U.S. PATENT DOCUMENTS

| | | | |
|---|---|---|---|
| 2012/0121055 A1 | 5/2012 | Yokoyama et al. | |
| 2012/0300892 A1* | 11/2012 | Bell | G21C 17/022 376/247 |
| 2013/0044851 A1 | 2/2013 | Winters | |
| 2013/0083879 A1 | 4/2013 | Heibel et al. | |
| 2013/0114776 A1 | 5/2013 | Thinguldstad et al. | |
| 2013/0272469 A1 | 10/2013 | Loewen | |
| 2014/0375274 A1* | 12/2014 | Tsai | G08C 17/02 702/188 |

FOREIGN PATENT DOCUMENTS

| | | | | |
|---|---|---|---|---|
| JP | 2011196801 | 10/2011 | | |
| JP | 2012078167 | 4/2012 | | |
| JP | 2012-233705 A | * 11/2012 | | Y02E 30/40 |
| JP | 2012233705 | 11/2012 | | |
| JP | 2013217923 | 10/2013 | | |
| KR | 10-1223273 B1 | 1/2013 | | |
| KR | 101223273 | 1/2013 | | |
| WO | WO2013030929 | 3/2013 | | |

OTHER PUBLICATIONS

Extended European Search Report in European Application No. 15875985.2, dated Jun. 7, 2018, 8 pages.
International Preliminary Report on Patentability in International Application No. PCT/US2015/066471, dated Jul. 4, 2017, 10 pages.
Japanese Office Action in Japanese Application No. 2017-534783, dated Jul. 27, 2018, 7 pages with English Translation.

* cited by examiner

REMOTE MONITORING OF CRITICAL REACTOR PARAMETERS

PRIORITY CLAIM

This application claims the benefit of prior U.S. provisional application Ser. No. 62/098,514, filed Dec. 31, 2014, the contents of which are incorporated by reference.

STATEMENT REGARDING GOVERNMENT INTERESTS

This invention was made with Government support under Cooperative Agreement No. DE-NE0000633 awarded by DOE. The Government has certain rights in this invention.

FIELD OF THE INVENTION

This disclosure generally relates to a nuclear reactor instrumentation system.

BACKGROUND OF THE INVENTION

Nuclear reactor instrumentation systems include a multitude of sensors for monitoring various nuclear reactor system parameters, e.g., pressure, temperature, liquid level, and neutron flux. The data measured by the sensors in the reactor instrumentation system are generally transmitted to a control room and displayed on meters, gauges, or display screens to nuclear reactor operators. The operators rely on data provided by reactor instrumentation systems to safely operate the nuclear reactor system and to identify and respond to potential emergency situations.

With respect to nuclear reactor systems, issues may arise beyond the design of the nuclear power plant, including external events or accidents such as seismic events, aircraft impacts, a complete loss of power, or accidents directly affecting a control room and not the reactor (e.g., fire in the control room). While these types of accidents may not directly affect a nuclear reactor such as to trigger design basis protection systems, they may affect an operator's ability to monitor the reactor. For example, a fire in a control room, a complete loss of electrical power, or an aircraft impact may be isolated from the reactor but may nonetheless impair the reactor monitoring systems or the control room. Alternatively, such events may also directly affect the reactor or the buildings or locations where the events occur, thereby creating conditions that are hazardous to safe human habitability and which may impede the ability to monitor conditions locally.

The invention as described below is directed to a remote monitoring system which, in some versions, may prevent reactor operators or emergency personnel from having to enter a hazardous environment in order to determine critical reactor parameters necessary to verify proper operation or reactor safety systems (e.g., decay heat removal systems and containment systems) upon the occurrence of such accidents or events.

SUMMARY OF THE INVENTION

The present disclosure describes a remote nuclear reactor instrumentation monitoring system. Various implementations described in this disclosure may include some or all of the following features.

In some versions, a remote nuclear reactor instrumentation monitoring system may include a wireless transmitter, a backup power source (e.g., a battery, radioisotope thermoelectric generator (RTG), or other backup power source), and one or more processors (e.g., a microprocessor, microcontroller, or finite state machine). The processors may be programmed to identify a loss of normal power to a nuclear reactor instrumentation system and, in response to identifying the loss of normal power, cause power to be provided from the backup power source to the wireless transmitter and one or more reactor instrumentation sensors. The processors may further receive data from the reactor instrumentation sensors and cause the wireless transmitter to transmit the data to one or more computing devices (e.g., a desktop computer, laptop computer, one or more servers, a tablet computer, a smartphone, etc.).

In some examples, the reactor instrumentation sensors may measure various nuclear reactor plant parameters (e.g., pressures, temperatures, liquid levels, and neutron flux or fluence). In preferred versions, a remote nuclear reactor instrumentation system may provide nuclear reactor operators with a safe and secure means for monitoring various reactor plant parameters, such as one or more of those referred to above, during a beyond-design-basis nuclear plant event or accident.

In some versions of the invention, the backup power source is a radioisotope thermoelectric generator.

In some versions of the invention, the loss of normal power to the nuclear reactor system comprises the identification of a complete loss of power to the nuclear reactor system.

In yet other examples, the loss of power comprises a loss of power to a post-accident monitoring system.

In some versions, the invention comprises a wireless transmitter, and in some implementations the wireless transmitter is located in a reactor building. In accordance with preferred implementations, the wireless transmitter causes data to be transmitted to a location remote from the reactor building.

The wireless transmitter, in some examples of the invention, is a one-way transmitter.

In some versions, the operations comprise logging data from one or more sensors. Signal conditioning circuitry may further be provided, electrically connected to the one or more sensors and the wireless transmitter. In some examples, signal multiplexing circuitry is electrically connected to the one or more sensors and the wireless transmitter.

In various versions of the invention, the one or more sensors may include one or more sensors for monitoring a valve position indication, reactor coolant system temperature, reactor coolant system pressure, reactor coolant system level, containment temperature, containment pressure, containment level, decay heat removal level, decay heat removal pressure, reactor pool and spent fuel pool level, reactor pool and spent fuel pool temperature, neutron flux, and control rod position. In some versions, the post-accident monitoring system monitors one or more of the above sensors.

In some examples, the normal power is electrically connected to a backup power source to charge the backup power source during normal reactor operations.

In preferred versions, the system includes one or more computing devices having a wireless receiver configured to receive the data transmitted by the wireless transmitter.

In one version of the invention, the wireless transmitter is located within a protected area. Most preferably, the operations comprise causing the wireless transmitter to transmit data from the protected area to a remote area.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

The details of one or more implementations of the subject matter described in this specification are set forth in the accompanying drawings and the description below. Other features, aspects, and advantages of the subject matter will become apparent from the description, the drawings, and the claims.

Figure 1:
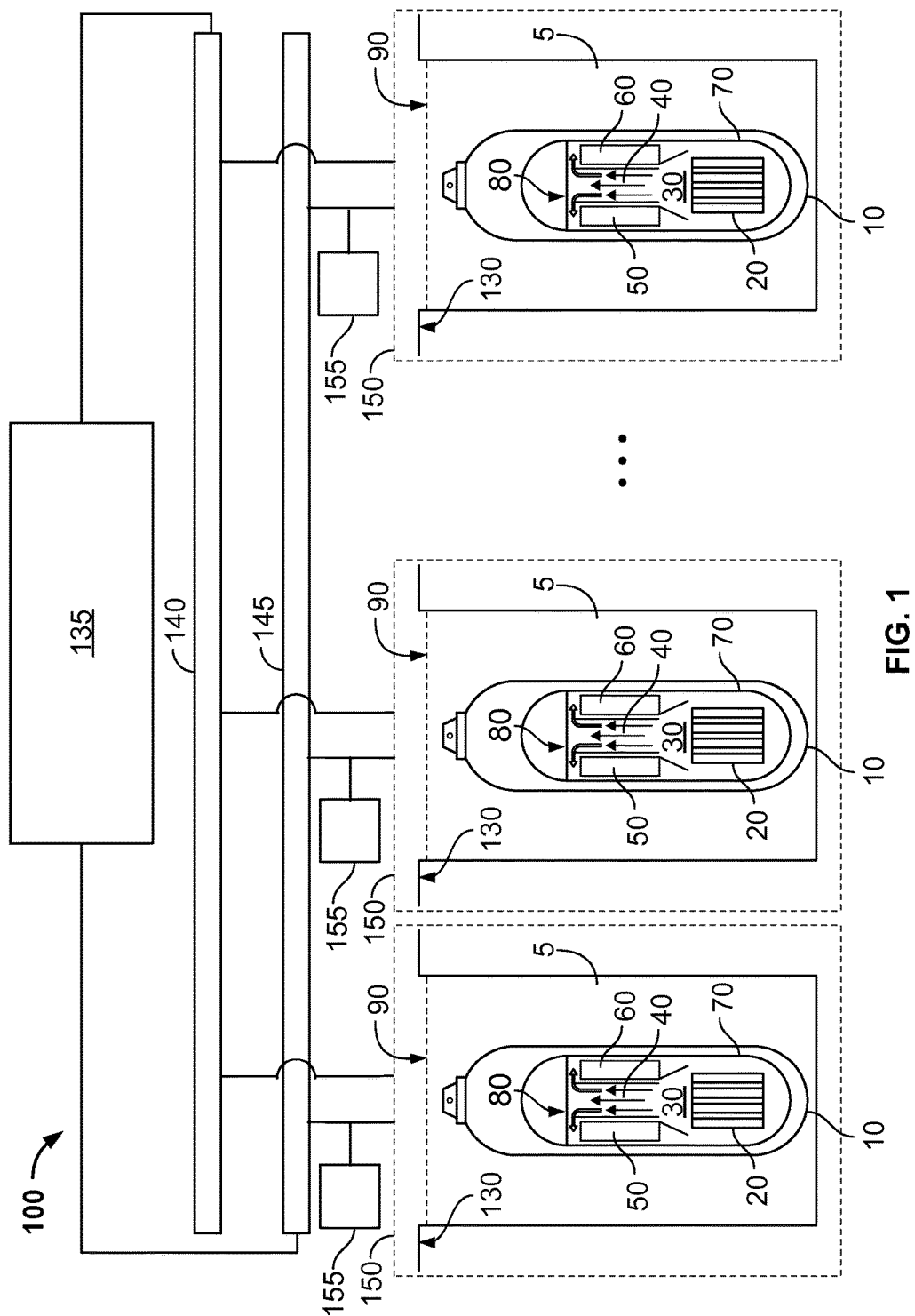
FIG. 1 is a block diagram of an example implementation of a nuclear power system that includes multiple nuclear power reactors and an electrical power distribution system.

FIG. 1 illustrates an example implementation of a nuclear power system 100 that includes multiple nuclear reactor systems 150 and remote monitoring systems 155. In some implementations, the system 100 may provide for a remote nuclear reactor instrumentation monitoring system powered from a backup or reserve power supply. In some aspects, a remote monitoring system 155 is powered from a backup or reserve power supply such as, for example, a qualified battery system (e.g., VLA type batteries), a non-qualified battery system (e.g., VRLA type batteries), an RTG, or other backup power source.

The example remote monitoring system 155 includes a wireless transmitter electrically coupled to one or more reactor instrumentation sensors (e.g., active post-accident monitoring (PAM) variables). Upon the loss of a primary reactor instrumentation system (e.g., due to a an accident or event such as those described above) the remote monitoring system 155 may be activated to monitor the nuclear reactor instrumentation sensors and transmit received data wirelessly to one or more computing devices located a safe distance from the accident.

In some implementations, the remote monitoring system 155 may include a sensor (e.g., an electro-mechanical device or a computing device having one or more processors) that detects one or more indications that a primary reactor instrumentation system is not operating normally. The remote monitoring system 155 may then be triggered to begin monitoring nuclear reactor system parameters and wirelessly transmitting the monitored data. In some implementations, the reactor instrumentation sensors monitored by the remote monitoring system 155 may include one or more of: valve position indication, reactor coolant system temperature, reactor coolant system pressure, reactor coolant system level, containment temperature, containment pressure, containment level, decay heat removal level, decay heat removal pressure, reactor pool and spent fuel pool level, reactor pool and spent fuel pool temperature, neutron flux (or fluence), and control rod position.

In FIG. 1, the system 100 includes multiple nuclear reactor systems 150 that are electrically coupled to an electrical power system 135. Although only three nuclear reactor systems 150 are shown in this example, there may be fewer or more systems 150 that are included within or coupled to the nuclear power system 100 (e.g., 6, 9, 12, or otherwise). In one preferred implementation, there may be twelve nuclear reactor systems 150 included within the system 100, with one or more of the nuclear reactor systems 150 including a modular, light-water reactor as further described below.

With respect to each nuclear reactor system 150, in a preferred version of the invention a reactor core 20 is positioned at a bottom portion of a cylinder-shaped or capsule-shaped reactor vessel 70. Reactor core 20 includes a quantity of fissile material that produces a controlled reaction that may occur over a period of perhaps several years or longer. Although not shown explicitly in FIG. 1, control rods may be employed to control the rate of fission within reactor core 20. Control rods may include silver, indium, cadmium, boron, cobalt, hafnium, dysprosium, gadolinium, samarium, erbium, and europium, or their alloys and compounds. However, these are merely a few of many possible control rod materials. In nuclear reactors designed with passive operating systems, various physical, chemical, or other properties are employed to ensure that safe operation of the nuclear reactor is maintained during normal operation or even in an emergency condition without operator intervention or supervision, at least for some pre-defined period of time.

In implementations, a cylinder-shaped or capsule-shaped containment vessel 10 surrounds reactor vessel 70 and is partially or completely submerged in a reactor pool, such as below waterline 90, within reactor bay 5. The volume between reactor vessel 70 and containment vessel 10 may be partially or completely evacuated to reduce heat transfer from reactor vessel 70 to the reactor pool. However, in other implementations, the volume between reactor vessel 70 and containment vessel 10 may be at least partially filled with a gas and/or a liquid that increases heat transfer between the reactor and containment vessels. Containment vessel 10 may rest on a skirt (not shown) at the base of reactor bay 5.

In a particular implementation, reactor core 20 is submerged within a liquid, such as water, which may include boron or other additive, which rises into channel 30 after making contact with a surface of the reactor core. In FIG. 1, the upward motion of heated coolant is represented by arrows 40 within channel 30. The coolant travels over the top of heat exchangers 50 and 60 and is drawn downward by way of convection along the inner walls of reactor vessel 70 thus allowing the coolant to impart heat to heat exchangers 50 and 60. After reaching a bottom portion of the reactor vessel, contact with reactor core 20 results in heating the coolant, which again rises through channel 30.

Although heat exchangers 50 and 60 are shown as two distinct elements in FIG. 1, heat exchangers 50 and 60 may represent any number of helical coils that wrap around at least a portion of channel 30. In another implementation, a different number of helical coils may wrap around channel 30 in an opposite direction, in which, for example, a first helical coil wraps helically in a counterclockwise direction, while a second helical coil wraps helically in a clockwise direction. However, nothing prevents the use of differently-configured and/or differently-oriented heat exchangers and implementations are not limited in this regard. Further, although water line 80 is shown as being positioned just above upper portions of heat exchangers 50 and 60, in other implementations, reactor vessel 70 may include lesser or greater amounts of water.

In FIG. 1, normal operation of the nuclear reactor module proceeds in a manner wherein heated coolant rises through channel 30 and makes contact with heat exchangers 50 and 60. After contacting heat exchangers 50 and 60, the coolant sinks towards the bottom of reactor vessel 70 in a manner that induces a thermal siphoning process. In the example of FIG. 1, coolant within reactor vessel 70 remains at a pressure above atmospheric pressure, thus allowing the coolant to maintain a high temperature without vaporizing (e.g., boiling). In some implementations, the nuclear reactor system 150 may operate at saturation pressure. In such implementations, coolant within reactor vessel 70 may remain at a saturation pressure while circulating (e.g., natural) to cool the core 20 and transfer heat to coolant within heat exchangers 50 and 60.

As coolant within heat exchangers 50 and 60 increases in temperature, the coolant may begin to boil. As the coolant within heat exchangers 50 and 60 begins to boil, vaporized coolant, such as steam, may be used to drive one or more turbines that convert the thermal potential energy of steam into electrical energy. After condensing, coolant is returned to locations near the base of heat exchangers 50 and 60.

During normal operation of the reactor module of FIG. 1, various performance parameters of the reactor may be monitored by way of sensors positioned at various locations within the module. Sensors within the reactor module may measure reactor system temperatures, reactor system pressures, containment vessel pressure, reactor primary and/or secondary coolant levels, reactor core neutron flux (or fluence), and/or reactor core neutron fluence. Signals that represent these measurements may be reported external to the reactor module by way of a conduit to a reactor bay interface panel (not shown), e.g., in a control room.

One or more of the components and sensors of each nuclear reactor system 150 may be critical loads, such as, for example, active engineered safety feature (ESF) loads such as containment isolation valves, decay heat removal (DHR) valves, other actuatable valves and equipment, as well as sensors. In some aspects, such ESF components may be designed to fail to their safety position upon loss of control power or motive power.

In addition, one or more of the components and sensors of each nuclear reactor system 150 may be non-critical loads, such as, for example, active PAM variables. PAM variables may include, for example, ESF actuation system valve position indication, reactor coolant system temperature, reactor coolant system pressure, reactor coolant system level, containment temperature, containment pressure, containment level, decay heat removal level, decay heat removal pressure, reactor pool and spent fuel pool level, reactor pool and spent fuel pool temperature, neutron flux (or fluence), and control rod position.

In the illustrated nuclear power system 100, the electrical power system 135 (shown in block diagram form) may provide AC and DC current to all of the electrical loads of the nuclear reactor systems 150 in the system 100. For example, AC power (e.g., 120 VAC, one phase, 60 Hz) may be provided to the nuclear reactor systems 150 through one or more AC busses 145 (illustrated as one bus but contemplated as more than one parallel bus). AC power bus 145, in some aspects, may supply AC power to critical loads (e.g., ESF loads). AC power may also be provided to non-critical loads of the nuclear reactor systems 150 through one or more AC busses 140 (illustrated as one bus but contemplated as more than one parallel bus).

The remote monitoring system 155 is at least communicably coupled to the electrical power system 135 (e.g., at AC busses 140, 145, or both, and/or to a bus supplying DC current) to monitor for power losses or other events that may give rise to a loss of normal reactor instrumentation systems.

In some implementations, the remote monitoring system 155 receives power from the electrical power system 135 during normal nuclear reactor system operation to charge a remote monitoring system backup power supply. In some implementations, the remote monitoring system 155 is communicatively coupled to other nuclear reactor systems (not shown; e.g., control room alarm systems) to monitor for other events that may make normal means of monitoring nuclear reactor system parameters difficult or hazardous for operators.

Although FIG. 1 illustrates a separate remote monitoring system 155 as being associated with each nuclear reactor system 150, in some implementations, a single remote monitoring system 155 may be used to monitor nuclear reactor sensors associated with multiple nuclear reactor systems 150. In some implementations, a single remote monitoring system may be used to monitor reactor instrumentation sensors associated with all of the nuclear reactor systems 150 in a nuclear power system 100.

Figure 2:
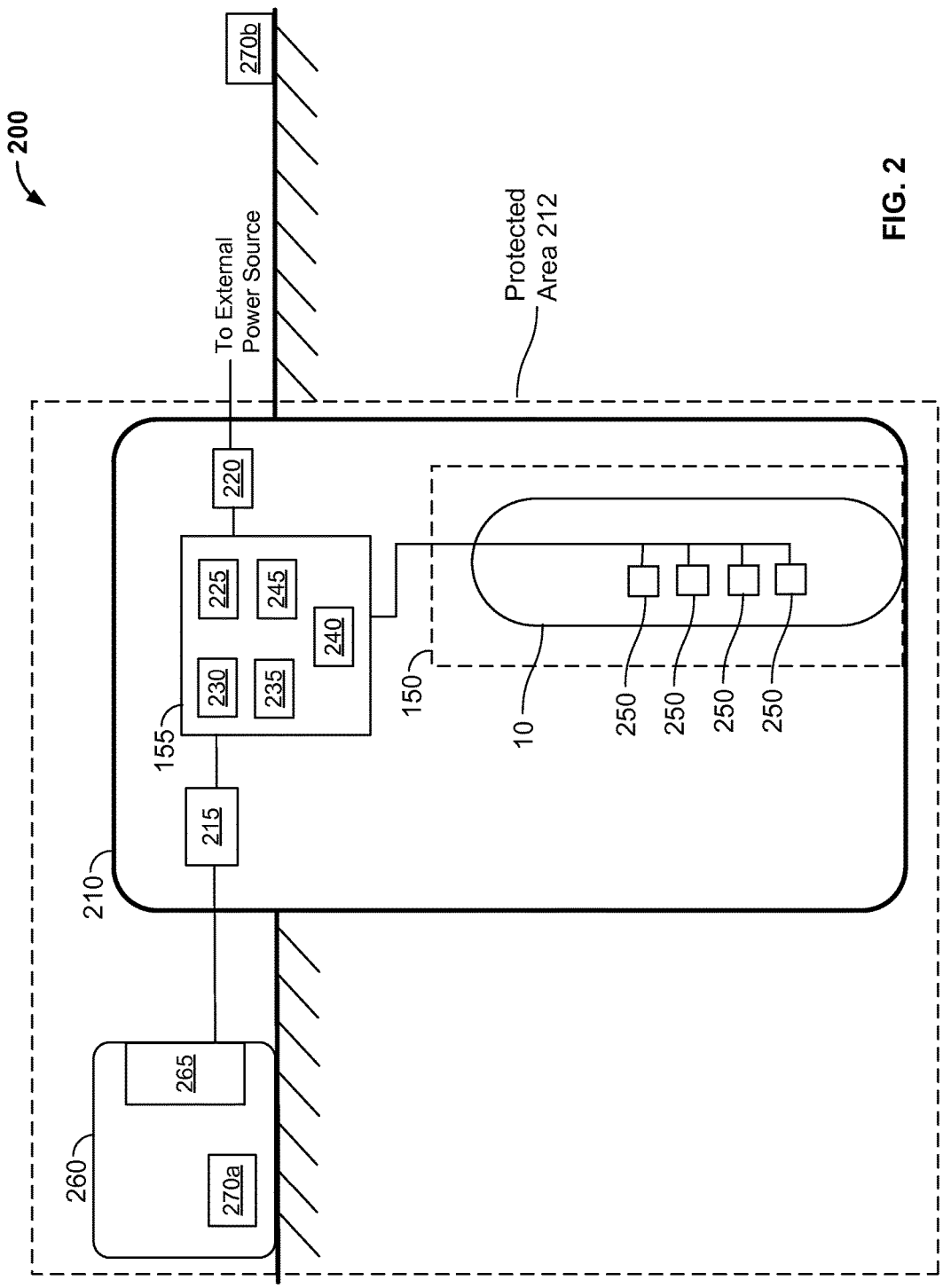
FIG. 2 is a block diagram of a remote monitoring system for a nuclear power system that uses a back-up power source.

FIG. 2 illustrates a block diagram of a nuclear power instrumentation system 200 that includes a remote monitoring system 155 that uses a back-up power source. For example, in some aspects, system 200 includes one or more nuclear reactor systems 150, a remote monitoring system 155, a normal power source 215 (e.g., electrical power system 135), reactor instrumentation sensors 250 (e.g., active post-accident monitoring (PAM) variables), and a control room 260. The nuclear reactor system 150, and, optionally, the normal power source 215, remote monitoring system 155, and backup power source 220 are housed in a reactor building 210.

In some implementations, a protected area 212 may be designated around one or more reactor buildings 210 at a nuclear power plant site. A protected area 212 may, for example, be an area encompassing a nuclear power plant and its safety equipment.

The control room 260 may include one or more reactor interface panels 265 for displaying the reactor plant parameters as measured by the nuclear reactor instrumentation system 200 to operators.

The backup power source 220 may be, for example, a qualified battery system (e.g., VLA type batteries), a non-qualified battery system (e.g., VRLA type batteries), a radioisotope thermoelectric generator (RTG), or other backup power supply. In some implementations, the backup power supply may include a connection (e.g., the "To External Power Source" block of FIG. 2) for an external power source (e.g., diesel generator, gasoline generator, combustion/turbine generator). The external power may be supplemental to or in replacement of backup power source 220.

The reactor instrumentation sensors 250 may be digital, analog, or a combination of digital and analog sensors positioned at various locations within the reactor system 150. Reactor instrumentations sensors 250 may measure reactor system temperatures, reactor system pressures, containment vessel pressure, reactor primary and/or secondary coolant levels, reactor core neutron flux, and/or reactor core neutron fluence. The reactor instrumentation sensors 250 may monitor PAM variables including, for example, ESF actuation system valve position indication, reactor coolant system temperature, reactor coolant system pressure, reactor coolant system level, containment temperature, containment pressure, containment level, decay heat removal level, decay heat removal pressure, reactor pool and spent fuel pool level, reactor pool and spent fuel pool temperature, neutron flux (or fluence), and control rod position.

The example remote monitoring system 155 is electrically coupled to the reactor instrumentation sensors 250 to receive data signals generated by the sensors 250 and includes a wireless transmitter 225 configured to receive the data signals from the reactor instrumentation sensors 250 and wirelessly transmit the reactor instrumentation data to one or more computing devices 270a and 270b (e.g., a desktop computer, laptop computer, server or group of servers, tablet computer, smartphone, cellular telephone, etc.) located outside of the reactor building 210. The remote monitoring system 155 may include a sensor 230, signal conditioning circuitry 235, signal multiplexing circuitry 240, and data logging circuitry 245.

The remote monitoring system sensor 230 can detect an event that causes a loss of the normal reactor instrumentation system, and, in response, can activate the remote monitoring system 155. For example, the sensor 230 may be configured to detect a loss of normal power to the normal reactor instrumentation system and/or a reactor system 150, a loss of power to a PAM system, a complete loss of power (e.g., a primary and a secondary means of power) to the reactor instrumentation system, a reactor system, and/or a PAM system, or an event causing damage to or loss of a reactor interface panel 265 or the control room 260 (e.g., a fire in the control room). In order to detect such events, the sensor 230 may, for example, monitor for power interruptions to the reactor instrumentation system, reactor system 150, and/or the PAM system.

In some implementations, the sensor 230 may be configured to monitor for emergency conditions in the control room 260, for example, by monitoring control room alarms which may require evacuation of the control room such as, e.g., a fire alarm or radiation alarm. In some implementations, the sensor 230 is an electro-mechanical device. Upon detecting an event such as those described above, the sensor 230 may establish an electrical connection between the backup power source 220 and the remote monitoring system 155. An electro-mechanical implementation of sensor 230 may, by establishing the electrical connection, provide power to the wireless transmitter 225 and to the remote monitoring system 155. In some implementations, the sensor 230 may be a power transistor, a semiconductor-controlled rectifier (SCR), a solid-state relay (SSR), or other appropriate device. In some implementations, the sensor 230 may be a computing device (e.g., a microprocessor, microcontroller, or finite state machine) programmed to monitor for and detect an event causing a loss of the reactor instrumentation system, activate the remote monitoring system 155, and control further operation of the remote monitoring system 155.

The signal conditioning circuitry 235 may package the data conveyed by the reactor instrumentation sensor 250 signals for transmission by the wireless transmitter 225, for example, by encapsulating the data in appropriate data packets. The signal conditioning circuitry 235 may also include analog to digital signal conversion circuitry. Additionally, in the case of signals received from analog sensors, signal conditioning circuitry 235 may amplify, filter, and range match the signals.

During normal operation, power is provided from the normal power source 215 to the reactor instrumentation sensors 250. The reactor instrumentation sensors 250 monitor various reactor system 150 parameters and transmit signals representing these measurements to operators on a reactor interface panel 265 in the control room 260. During normal operations, the signals or data from the instrumentation sensors 250 may be communicated to the control room 260 and reactor interface panel 265 using wired communications or, optionally, wireless communications. In some implementations, the backup power source 220 is also charged by the normal power source 215 during normal operation.

When the remote monitoring system 155 (e.g., sensor 230) detects an event that causes a loss of the reactor instrumentation system, the remote monitoring system 155 is activated to transmit data from the reactor instrumentation sensors 250 to computing devices 270a and 270b located outside of the reactor building 210. Activating the remote monitoring system 155 may include connecting the remote monitoring system 155 to the backup power supply 220, e.g., by causing an electro mechanical device or solid state switch to actuate. The remote monitoring system 155 then receives data signals from the nuclear instrumentation sensors 250 and transmits the data to the computing devices 270a and 270b having receivers configured to receive the transmitted data. For example, before receiving data from the wireless transmitter the computing devices 270a and 270b may be required to provide authentication credentials. Thus, the remote monitoring system 155 may provide nuclear operators with a safe and secure means for monitoring reactor parameters from a remote location if access or power to a normal means of monitoring a reactor instrumentation system is lost. In some implementations, the remote monitoring system 155 may also provide power (e.g., from the backup power source 220) to one or more of the nuclear instrumentations sensors 250.

In some implementations, wireless transmitter 225 is capable of transmitting signals of sufficient strength to be received by computing devices 270a and 270b located outside of the protected area 212. In some implementations, the wireless transmitter 225 is a one-way transmitter, for instance, the wireless transmitter 225 may not include a wireless signal receiver, and may thereby, prevent unauthorized alteration of the remote monitoring system 155 and data transmitted by the remote monitoring system. In some implementations, the nuclear instrument sensor data may be encrypted prior to being transmitted by the wireless transmitter. In addition, in order to receive data from the wireless transmitter the computing devices 270a and 270b may be preconfigured to be capable of decrypting the encrypted data from the wireless transmitter 225.

Figure 3:
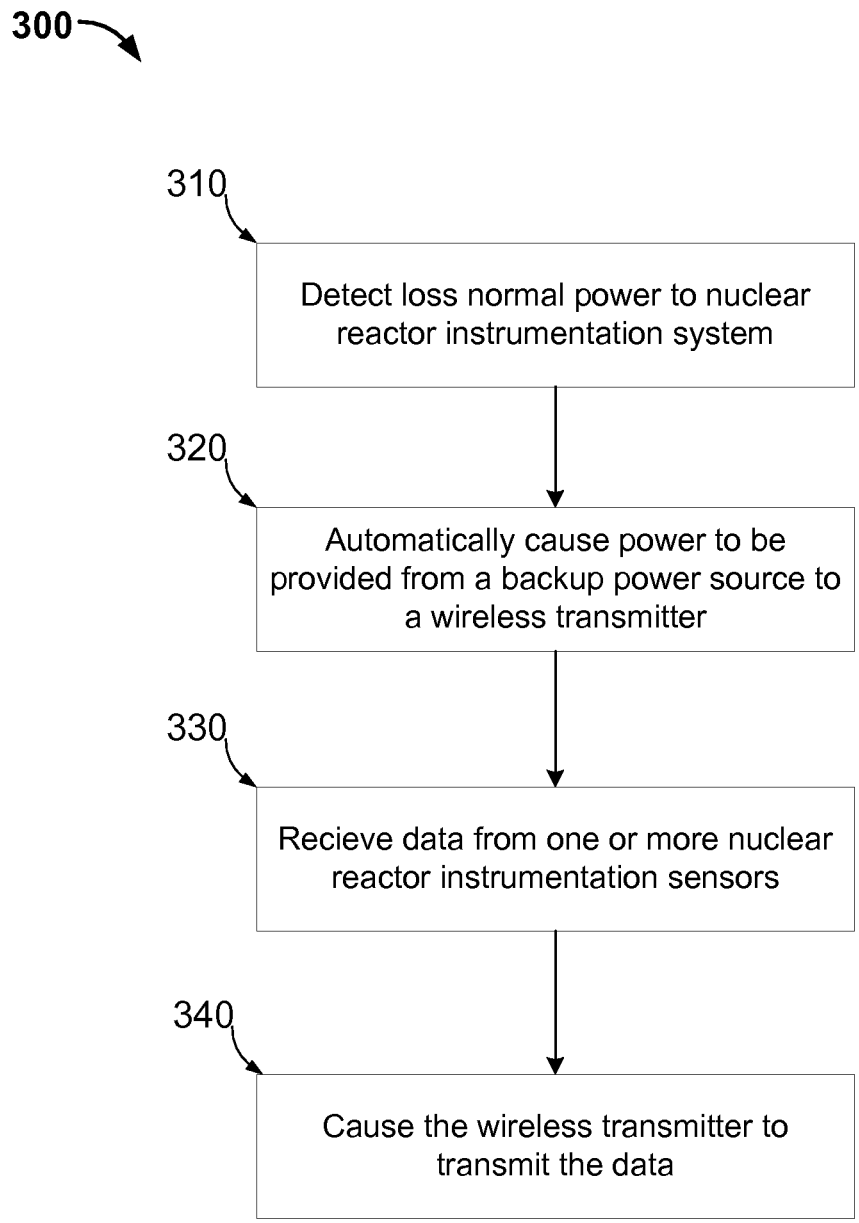
FIG. 3 is a flowchart that illustrates an example method for operating a remote monitoring system for a nuclear power system.

FIG. 3 is a flowchart that illustrates an example method 300 for operating a remote monitoring system for a nuclear power system. In some implementations, method 300 may be executed by or with a remote monitoring system 155. More specifically, in some implementations, method 300 may be executed by or with sensor 230 of a remote monitoring system 155, e.g., in implementations in which the sensor is a computing device.

Method 300 is described in reference to the remote monitoring system 155 of FIG. 2 above. Method 300 may begin at step 310, which includes detecting a loss of normal power to a nuclear reactor instrumentation system. The detected loss of power may be a complete loss of power to a reactor system (e.g., reactor system 150), or a loss of power to a PAM system. In some implementations, detecting the loss of normal power may include detecting a loss of power to a control room 260 or a reactor interface panel 265 in a control room 260.

Method 300 may also include step 320, which includes automatically causing power to be provided from a backup power source 220 to a wireless transmitter 225 and reactor instrumentation sensors 250 in response to detecting the loss of power. For example, the remote monitoring system may cause an electro mechanical device or solid state switch to actuate, thereby, connecting the wireless transmitter 225 and reactor instrumentation sensors 250 to the backup power source 220. In some examples, the wireless transmitter 225 may normally be maintained in a low power mode (e.g., sleep mode), and during step 320 the remote monitoring system 155 (e.g., sensor 230) may cause the wireless transmitter 225 to transition to an active mode (e.g., waking up the wireless transmitter). In some implementations, step 320 may refer to activating the remote monitoring system 155 in response to a sensor 230 of the remote monitoring system 155 detecting the loss of normal power event. In such implementations, the remote monitoring system 155 may normally be maintained in a low power (e.g., sleep mode), and during step 320 transitioned into an active mode (e.g., waking up the remote monitoring system).

Method 300 may also include step 330, which includes receiving data from one or more nuclear reactor instrumentation sensors 250. For example, as described above in reference to FIG. 2, a remote monitoring system 155 receives data signals from reactor instrumentation sensors 250. In some examples, as described in reference to FIG. 2 above, the remote monitoring system 155 may condition the data signals received form the reactor instrumentation signals using signal conditioning circuitry 235. Additionally, the remote monitoring system 155 may alternately select data to be transmitted from among the reactor instrumentation sensors 250, for example, using signal multiplexing circuitry 240. In addition, the remote monitoring system may store the data using data logging circuitry 245.

Method 300 may also include step 340, which includes causing the wireless transmitter 225 to transmit the data to one or more computing devices 270a or 270b. In some implementations, wireless transmitter 225 is capable of transmitting signals of sufficient strength to be received by computing devices 270a and 270b located outside the reactor building 210 and the protected area 212. In some implementations, the wireless transmitter 225 may only transmit data and not receive data. In some implementations, the reactor instrument sensor data may be encrypted prior to being transmitted by the wireless transmitter. In addition, in order to receive data from the wireless transmitter, the computing devices 270a and 270b may be preconfigured to be capable of decrypting the encrypted data from the wireless transmitter 225.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer, storage medium is not a propagated signal; a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit). Processors suitable for the execution of a computer program include, by way of example, both general and special purpose microprocessors, and anyone or more processors of any kind of digital computer. Generally, a processor will receive instructions and data from a read only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results. Accordingly, the above description of example implementations does not define or constrain this disclosure. Other changes, substitutions, and alterations are also possible without departing from the spirit and scope of this disclosure. Accordingly, the invention should be determined entirely by reference to the claims that follow.

What is claimed is:

1. A nuclear reactor instrumentation system for monitoring a nuclear power system having a reactor core within a reactor vessel, the reactor vessel having a plurality of sensors for monitoring parameters of the nuclear power system, comprising:
   a computer having a processor configured to be powered by a normal power source and a backup power source;
   a one-way wireless transmitter operable under the control of the processor and housed in a reactor building with the nuclear power system;
   one or more remote monitoring computers positioned external to the reactor building and communicably coupled to the computer through the one-way wireless transmitter;
   at least one sensor communicably coupled to the computer and operable to switch power to the computer from the normal power source to the backup power source upon a loss of normal power form the normal power source; and
   at least one memory coupled to the processor and containing stored programming instructions which, when executed by the processor, cause the processor to:
   receive data from the sensors;
   identify the loss of normal power from the normal power source; and
   in response to identifying the loss of normal power, cause the one-way wireless transmitter to transmit an encrypted version of the received data from the computer to the one or more remote monitoring computers in a single direction wireless transmission from the one-way wireless transmitter to the one or more remote monitoring computers.

2. The nuclear reactor instrumentation system of claim 1, wherein the stored programming instructions further cause the processor to switch operation of the computer from the normal power source to the backup power source.

3. The nuclear reactor instrumentation system of claim 2, wherein the identified loss of normal power comprises a loss of power to a post-accident monitoring system.

4. The nuclear reactor instrumentation system of claim 2, wherein the identified loss of normal power comprises a loss of power to a nuclear power system control room.

5. The nuclear reactor instrumentation system of claim 2, wherein the identified loss of normal power comprises a loss of power to one or more nuclear power system monitoring panels.

6. The nuclear reactor instrumentation system of claim 1, wherein the one or more remote monitoring computers are configured to receive the encrypted version of the data transmitted from the one-way wireless transmitter and decrypt the encrypted version of the data.

7. The nuclear reactor instrumentation system of claim 1, wherein the one or more sensors comprises one or more of a valve position indicator, a temperature gauge, and a pressure gauge.

8. The nuclear reactor instrumentation system of claim 1, wherein the reactor building is positioned in a protected area that encompasses the nuclear power system and the nuclear reactor instrumentation system.

9. The nuclear reactor instrumentation system of claim 8, wherein the one or more remote monitoring computers are positioned outside of the protected area.

10. The nuclear reactor instrumentation system of claim 1, wherein the at least one sensor comprises an electro-mechanical switch.

11. The nuclear reactor instrumentation system of claim 1, wherein the backup power source comprises a qualified battery system of VLA batteries.

12. The nuclear reactor instrumentation system of claim 11, wherein the backup power source is electrically coupled to an external power source that comprises a generator.

13. The nuclear reactor instrumentation system of claim 2, wherein the identified loss of normal power comprises a loss of power to a post-accident monitoring system, a loss of power to a nuclear power system control room, and a loss of power to one or more nuclear power system monitoring panels.

14. The nuclear reactor instrumentation system of claim 13, wherein the one or more remote monitoring computers are configured to receive the encrypted version of the data transmitted from the one-way wireless transmitter and decrypt the encrypted version of the data.

15. The nuclear reactor instrumentation system of claim 14, wherein the one or more sensors comprises one or more of a valve position indicator, a temperature gauge, and a pressure gauge.

16. The nuclear reactor instrumentation system of claim 15, wherein the reactor building is positioned in a protected area that encompasses the nuclear power system and the nuclear reactor instrumentation system, and the one or more remote monitoring computers are positioned outside of the protected area.

17. The nuclear reactor instrumentation system of claim 16, wherein the at least one sensor comprises an electro-mechanical switch.

18. The nuclear reactor instrumentation system of claim 17, wherein the backup power source comprises a qualified battery system of VLA batteries, and the backup power source is electrically coupled to an external power source that comprises a generator.

19. The nuclear reactor instrumentation system of claim 1, wherein the stored programming instructions further cause the processor to request authentication credentials from at least one of the one or more remote monitoring computers.

20. The nuclear reactor instrumentation system of claim 1, wherein the stored programming instructions further cause the processor to provide power from the backup power source to the plurality of sensors for monitoring parameters of the nuclear power system upon the loss of normal power.

* * * * *